United States Patent Office 3,542,764
Patented Nov. 24, 1970

---

3,542,764
PROCESS FOR MANUFACTURING TELLURO-
PHENE AND ITS DERIVATIVES
Wilhelm Mack, Olching, Upper Bavaria, Germany, assignor to Consortium für Elektrochemische Industrie G.m.b.H., Munich, Bavaria, Germany, a corporation of Germany
No Drawing. Filed Mar. 9, 1967, Ser. No. 621,785
Claims priority, application Germany, Mar. 11, 1966,
C 38,468
Int. Cl. C07d 83/00, 99/02
U.S. Cl. 260—239  2 Claims

ABSTRACT OF THE DISCLOSURE

This invention relates to the manufacture of tellurophene and its 2 and 2,5 substituted derivatives, and it has for its object to provide, for the first time, a simple and efficient process for making such products.

BACKGROUND OF THE INVENTION

Until now the ring system of tellurophene has been known only by the tetraphenyl- (see E. A. Braye, W. Hübel and J. Caplier, J. Amer. Chem. Soc., vol. 83, 4406 (1961) and tetrachlor- derivatives (see W. Mack Applied Chemistry, vol. 77, 260 (1965)). However, no generally applicable method of obtaining the basic body or its derivatives has heretofore existed. Only futile attempts to make tellurophene or its derivatives have been known until recently (see W. G. Zoellner, Diss. Abstr. 19, 3139 (1959).

SUMMARY OF THE INVENTION

I have discovered a process for making tellurophene and its 2 and 2,5 substituted derivatives which is characterized by the fact that metal tellurides are transformed with diacetylene compounds with the general formula R—C≡C—C≡C—R; where R and R′ can be a hydrogen atom and/or any desired organic residue—in solvents which have unstable hydrogen atoms.

DESCRIPTION OF THE PREFERRED EMBODIMENTS

In carrying out my process the reaction temperature can range between —50° C. and the decomposition point of the compounds; preferred are temperatures between 0° C. and 100° C. At temperatures above 0° C. the application of pressures above atmospheric may become necessary to maintain a liquid phase.

Preferred are the tellurides of alkaline earth or the alkali metals. Particularly preferred are the tellurides of the alkali metals, especially potassium telluride and sodium telluride.

As solvents with unstable (motile) hydrogen atoms one can use particularly those solvents which, although they split off protons under favorable circumstances, do not free any hydrogen telluride from the metallic telluride, e.g., alcohols, water or liquid ammonia. Preferred is the use of lower aliphatic alcohols like methanol, ethyl alcohol, glycol- or glycol monomethyl ether.

It is advantageous to use the telluride and the diacetylene compound in dissolved form. However, the transformation is also possible in the heterogeneous phase, e.g., when working in water wherein the diacetylene compound might dissolve only slightly, or when using so little alcohol that there is still a sediment of undissolved telluride.

The reaction equation can be generally formulated as follows:

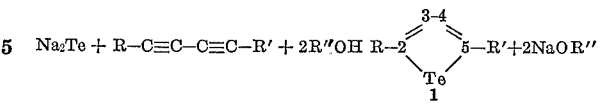

The quantitative proportions are not decisive; but it is useful to use the metallic telluride and the diacetylene compound in stoichiometric quantities.

Diacetylene yields in a simple manner the tellurophene itself, a colorless liquid with an aromatic character.

If R as well as R′ is an organic residue, one obtains 2,5-substituted derivatives of tellurophene; if one of the two residues R and R′ is a hydrogen atom, one obtains 2-substituted derivatives.

The smooth reaction of, for instance, 2,7-dimethylocta-3,5-diine-2,7-diol shows that the synthesis is not hampered even by bulky and polar substituents R and R′.

The only requirement for the residues R and R′ is that they should not contain any substituents which oxidize the telluride or which release $TeH_2$ as strong acids. Useable are all hydrocarbon residues like alkyl-, cyclo-alkyl-, aryl-, and aralkyl residues. As substituents of these residues one can use, for instance, groups containing oxygen and nitrogen like hydroxyl-, ether-, ester-, carbonyl-, carbonamide-, and amine groups which can also be part of a heterocyclic ring. Halogen substituted residues like tetrachlorophenyl, trifluormethyl, phenyl iodide proved to be inert under the reaction conditions. Groups containing sulphur or silicon like thioether, mercaptanes, sulfones and silanes can also be used.

Tellurophene itself and its derivatives can be used in drug synthesis, for making new pesticides, and as stabilizers and antioxidants in the plastic industry.

Example 1

65 mmol $Na_2Te$ are dissolved in 50 ml. methanol and to this Solution I add at 0° C. a solution of 64 mmol diacetylene in 10 ml. methanol. After the solution which was in the beginning colored red-violet by the telluride has been discolored, it is left to stand overnight at room temperature.

The theorical yield of tellurophene is 65%, the boiling point is 150° C./760 mm. The IR-, NMR- and mass spectra are in harmony with the suggested structure. With bromine the compound forms an orange-colored dibromide with a 4-valent tellurium, which is hard to dissolve in methanol. Point of decomposition 125° C.

Example 2

1.5 g. $Na_2Te$ are dissolved in 10 ml. methanol and compounded with 1.66 g. 2,7-dimethylocta-3,5-diine-2,7-diol, which is also dissolved in 10 ml. methanol. After leaving to stand overnight at room temperature and draining the methanol one obtains almost quantitatively 2,5-di-hydroxy-isopropyl tellurophene. Melting pt. 92° C. The structure clearly results from the IR- and NMR-spectrum.

Example 3

To a solution of 14 g. (68 mmol) of potassium telluride in 50 ml. methanol one adds drop by drop 7.5 g. (68 mmol) hexa-2,4-diine-1,6-diol dissolved in 50 ml. methanol at room temperature. Light heating to 30–40° C. The mixture is left to stand at room temperature for 16 hours. Then 2/3 of the methanol is distilled off, the residue is taken up with water and extracted with ether.

After draining off the ether there remained 2.6 g. 2,5-(bishydroxymethyl)-tellurophene. The aqueous layer was narrowed down and extracted four times with benzene. Another 2.0 g. of tellurophene derivative was obtained. Total yield 4.6 g. (28% of theory). White, easily water-soluble needles of melting point 107° C.

EXAMPLE 4

6.0 g. (35 mmol) sodium telluride were dissolved in 50 ml. ethanol and compounded at room temperature with a suspension of 7.0 g. (35 mmol) 1,4-diphenylbuta-1,3-diine in 50 ml. ethanol. This was stirred for 5 hours at room temperature and then refluxed for 10 hours. There is obtained a crystalline, brown sediment which is drained off and is first extracted with ether and then with benzene. From the benzene 6.3 g. (55% of theory) 2,5-diphenyl-tellurophene was isolated in the form of silvery shiny platelets. Melting point 223–225° C. From carbon tetrachloride, bromine precipitates 1,1-dibrom-2,5-bisphenyl-tellurophene of melting point 205° C. (decomposition).

EXAMPLE 5

3.5 g. (32.4 mmol) 2-methylhexa-3,5-diine-2-ol in 10 ml. methanol are compounded with 5.9 g. sodium telluride (34 mmol) in 50 ml. methanol. The temperature rises to 50° C. during this. Without heating any further, it is stirred for another 3 hours, then most of the methanol is distilled off, the residue is poured into water and extracted with ether. After distilling off the ether and recrystallizing the residue of cyclohexane 3.6 g. (47% of theory) of 2 - (dimethylhydroxymethyl) - tellurophene remain as colorless platelets with a melting point of 40° C.

EXAMPLE 6

60.7 g. 1,6-bis(N-pyrrolidino)-hexa-2,4-diine are dissolved in 200 ml. methanol, and 48.6 g. sodium telluride dissolved in 400 ml. methanol are added. After cooking for 3 hours at reflux the main quantity of methanol is distilled off, the dark colored residue is poured into water and extracted with ether. Distillation of the ether extract yields 62 g. (64% of theory) of 2,5-bis-(N-pyrrolidinomethyl)-tellurophene as a light yellow colored oil with boiling point 150° C./0.2 torr. 50 g. of the distillate are dissolved in 200 ml. ethanol and the bishydrochloride is precipitated with 200 ml. ethanolic hydrochloric acid in the form of colorless, easily water-soluble crystals. Yield: 56.3 g. (93% of theory). Point of decomposition: 330° C.

EXAMPLE 7

11.7 g. (72 mmol) dodeca-5,7-diine are dissolved in 20 ml. methanol and compounded with 12.5 g. (72 mmol) sodium telluride, dissolved in 50 ml. methanol. After refluxing for 15 hours the 2,5-bis-(n-butyl)-tellurophene, formed in quantitative yield, is isolated as a colorless liquid of boiling point 80° C./0.15 torr. Bromine in methanol precipitates in quantitative yield 1,1-dibrom-2,5-bis-(n-butyl)-tellurophene as orange colored crystals with a decomposition point of 175–180° C.

The invention claimed is:
1. Process for manufacturing tellurophene and its 2 and 2,5-substituted derivatives, which comprises reacting a metal telluride with a diacetylene compound of the type R—C≡C—C≡C—R′, where R and R′ are selected from the group consisting of hydrogen atoms, alkyl, aryl, hydroxyalkyl and N-pyrrolidino groups in a solvent selected from the group consisting of water, lower alkanols, lower alkylene diols and lower alkylene diol monomethyl ethers.
2. Process according to claim 1, in which said metal telluride is selected from the group consisting of sodium telluride and potassium telluride, and in which the reaction temperature is between −50° C. and the decomposition point of the product.

References Cited

UNITED STATES PATENTS 3,149,101   9/1964   Hubel et al. _____ 260—239

OTHER REFERENCES

Mack, Angew. Chem. International Edit., vol. 4, pp. 245–246 (1965).

McMahon et al., J. Chem. Soc. (London), 1933, p. 1644.

ALTON D. ROLLINS, Primary Examiner

U.S. Cl. X.R.

252—400; 260—326.9, 635, 668, 678